United States Patent Office 3,475,384
Patented Oct. 28, 1969

3,475,384
FLUORINE-CONTAINING POLYURETHANE
Floyd D. Trischler, San Diego, Calif., assignor to Whittaker Corporation, Los Angeles, Calif., a corporation of California
No Drawing. Filed Dec. 30, 1966, Ser. No. 605,964
Int. Cl. C08g 22/14
U.S. Cl. 260—77.5       5 Claims

ABSTRACT OF THE DISCLOSURE

A polyurethane polymer prepared by reacting a hydroxy-terminated polyformal having the formula

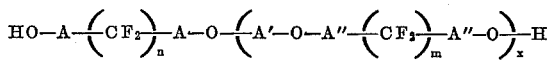

wherein A, A' and A" are alkylene, $m$ and $n$ are integers from 1 to about 10, and $x$ is an integer from 1 to about 100 with an organic diisocyanate having the formula

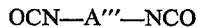

wherein A''' is a divalent organic group.

---

This invention relates to a novel class of fluorine-containing polyurethane polymers prepared by the reaction of fluorinated diisocyanates with fluorine-containing hydroxy-terminated formals.

This application is a continuation-in-part of United States patent application Ser. No. 554,959, now U.S. Patent No. 3,419,531, the disclosure of which is expressly incorporated herein by reference.

In the printed literature there has been brief reference to the synthesis of urethane polymers based on hydroxy-containing formals. However, these formals and the previously reported polyurethane polymers based thereon do not possess any significant improvement in chemical and thermal stability over the ordinary commercially available polyurethane polymers. In general, the ordinary polyurethanes do not possess a high degree of stability in the presence of strong acids and oxidizing agents. In addition the ordinary elastomeric polyurethanes are subject to degradation at elevated temperature unless there is added thereto a substantial amount of a stabilizer. Even in the situation where stabilizers are employed, the polyurethane does not always exhibit good properties at elevated temperature since many of the most readily available stabilizers tend to exude or otherwise fail at elevated temperatures. Accordingly, it can be seen that there has existed in the art a genuine need for a polyurethane polymer possessing a high degree of resistance to the effects of acid, strong oxidizing agents, and elevated temperatures. This the present invention provides to a very significant degree, and hence involves a substantial advance in the state of the art.

Thus, it is a principal object of the present invention to provide a novel class of polyurethane polymers.

More particularly, it is an object of the present invention to provide a novel class of polyurethane polymers.

Even more specifically, it is an object of the present invention to provide a novel class of polyurethane polymers which are acid, alkali and oxidizing agent resistant, based upon fluorine-containing formals and fluorine-containing diisocyanates.

mers which are fluorine-containing and which are based upon hydroxy-terminated fluorine-containing formals.

In another aspect of the present invention it is an object thereof to provide a new method for the preparation of novel fluorine-containing polyurethanes.

These and other objects and advantages of the present invention will be apparent from the more detailed description which follows.

Briefly, the present invention comprises a novel fluorine-containing polyurethane having the following repeating unit:

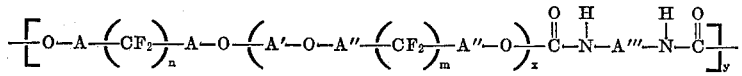

prepared by reacting a fluorine-containing hydroxy-terminated formal having the formula:

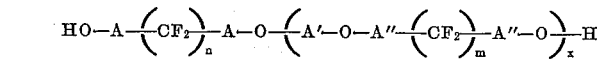

with a fluorine-containing organic diisocyanate having the formula:

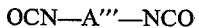

wherein A, A' and A" are alkylene groups, preferably containing from 1 to about 5 carbon atoms, such as methylene, ethylene, propylene, butylene and the like, A''' is a divalent organic group, preferably a fluorine-containing aromatic group such as perfluorophenylene and the like, $x$ and $y$ are integers from 1 to about 100, and $m$ and $n$ are integers from 1 to about 10.

In the above formulae, A''' may typically be:

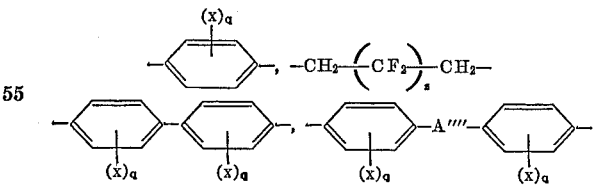

wherein $x$ is hydrogen, chlorine, fluorine or lower alkyl, normally having from 1 to about 5 carbon atoms; A'''' is oxygen, sulfur, imino, alkylated imino

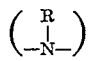

or alkylene; $q$ is an integer from 1 to 4, and $z$ is an integer from 1 to about 10. Generally, when A'''' is alkylated imino or alkylene, it contains from 1 to about 10 carbon atoms.

The novel polyurethanes of the present invention are generally prepared by reacting approximately stoichiometric amounts of the diisocyanate and formal of the above formulae. However, the invention envisions the use particularly of a slightly stoichiometric excess of diisocyanate. In this manner the polyurethane product is isocyanate-terminated, and hence is readily curable by materials which are complementary reactive with isocyanate groups. In general, any active hydrogen-containing material may be utilized to cure or chain-extend an isocyanate terminated polyurethane. Typical of such active hydrogen-containing compounds are diols, triols, water, amines, thiols, and the like.

This invention also includes the formation of prepolymers for use as coatings or adhesives. Isocyanate-terminated prepolymers can be prepared by using a greater than stoichiometric amount of diisocyanate. This prepolymer is subsequently advanced with active hydrogen containing compounds such as diamines, diols, dithiols, etc. Hydroxyl-terminated prepolymers can be prepared by using a greater than stoichiometric amount of diol. This prepolymer is subsequently advanced with additional diisocyanate.

The following example is presented to illustrate the invention. In the example, the parts and percentages are by weight unless otherwise indicated.

Example

Tetrafluoro-p-phenylene diisocyanate (3.7 g., 0.0160 mole) was added to the hydroxyl-terminated poly(hexafluoropentamethylene formal) of 600 molecular weight (8.0 g., 0.0133 mole) at 100° C. and mixed. The polymer was then post-cured at 165° C. for ½ hour to yield an extremely tough, flexible elastomer.

The properties of these polymers may be varied by suitable compounding. The amount and type of compounding agent to be incorporated in the stock is dependent upon the use for which the polymer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide, and plasticizers. Inorganic and organic coloring agents may be incorporated to give well defined colors.

Conventional rubber processing machinery such as rubber mills or Werner-Pfleiderer or Banbury mixers may be used. The resulting compounded stocks may be shaped and cured in conventional equipment used in the rubber industry. The solutions or dispersed gels prepared from the uncured polymers of this invention may be used for forming supported or unsupported films, for coating fabrics or solid surfaces, and for forming adhesive bonds between a wide variety of plastics, elastomers, fabrics, metals, wood, leather, ceramics and the like.

Diisocyanates suitable for the practice of this invention, but not limited thereto, are tetrafluoro-m-phenylene diisocyanate, tetrafluoro-p-phenylene diisocyanate, fluorotrichloro - p-phenylene diisocyanate, fluorotrichloro-m-phenylene diisocyanate, difluorodichloro-p-phenylene diisocyanate, difluorodichloro-m-phenylene diisocyanate, chlorotrifluoro-p-phenylene diisocyanate, chlorotrifluoro-m-phenylene diisocyanate, tetrachloro-m-phenylene diisocyanate, tetrachloro - p-phenylene diisocyanate, difluorotrimethylene diisocyanate, tetrafluorotetramethylene diisocyanate, hexafluoropentamethylene diisocyanate, octafluorohexamethylene diisocyanate, octafluorobiphenylene diisocyanate, oxybis (tetrafluorophenyl isocyanate), thiobis (teterafluorophenyl isocyanate), and methylene bis(tetrafluorophenyl isocyanate).

I claim:
1. A polyurethane polymer prepared by reacting a hydroxy-terminated polyformal having the formula

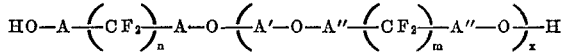

wherein A, A' and A'' are alkylene, $m$ and $n$ are integers from 1 to about 10 and $x$ is an integer from 1 to about 100 with an organic diisocyanate having the formula

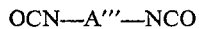

wherein A''' is a divalent organic group.

2. The polyurethane of claim 1 wherein, A, A' and A'' are methylene and A''' is a divalent perfluoro aromatic group.

3. The polyurethane of claim 1 wherein an excess of diisocyanate is used to prepare the polymer.

4. The polyurethane of claim 1 wherein an excess of polyformal is used to prepare the polymer.

5. The polyurethane of claim 1 wherein A, A' and A'' contain from 1 to 5 carbon atoms.

References Cited

UNITED STATES PATENTS

| | | | |
|---|---|---|---|
| 2,511,544 | 6/1950 | Rinke et al. | 260—77.5 |
| 2,911,390 | 11/1959 | Smith | 260—77.5 |
| 2,929,800 | 3/1960 | Hill | 260—77.5 |
| 3,196,132 | 7/1965 | Rosen | 260—75 |
| 3,234,184 | 2/1966 | McShane et al. | 260—75 |
| 3,326,855 | 6/1967 | Matzner et al. | 260—47 |

OTHER REFERENCES

Schonfeld, Journal of Polymer Science, vol. 59, pp. 87–92 (May 1962).

DONALD E. CZAJA, Primary Examiner

M. J. WELSH, Assistant Examiner

U.S. Cl. X.R.

117—161; 156—331; 260—37, 67